United States Patent
Makki et al.

(10) Patent No.: US 11,375,342 B2
(45) Date of Patent: Jun. 28, 2022

(54) APPARATUSES, METHODS AND COMPUTER PROGRAMS FOR GROUPING USERS IN A NON-ORTHOGONAL MULTIPLE ACCESS (NOMA) NETWORK

(71) Applicant: Telefonaktiebolaget LM Ericsson (Publ), Stockholm (SE)

(72) Inventors: Behrooz Makki, Gothenburg (SE); Ali Behravan, Stockholm (SE); Mona Hashemi, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 348 days.

(21) Appl. No.: 15/760,109

(22) PCT Filed: Feb. 15, 2018

(86) PCT No.: PCT/EP2018/053733
§ 371 (c)(1),
(2) Date: Mar. 14, 2018

(87) PCT Pub. No.: WO2019/158199
PCT Pub. Date: Aug. 22, 2019

(65) Prior Publication Data
US 2019/0253845 A1    Aug. 15, 2019

(51) Int. Cl.
*H04W 4/08*    (2009.01)
*H04W 52/26*    (2009.01)
(Continued)

(52) U.S. Cl.
CPC ............. *H04W 4/08* (2013.01); *H04L 5/006* (2013.01); *H04L 5/0037* (2013.01);
(Continued)

(58) Field of Classification Search
CPC ..... H04L 5/0037; H04L 5/006; H04L 5/0005; H04L 5/0051; H04W 72/1231;
(Continued)

(56) References Cited

U.S. PATENT DOCUMENTS 10,117,286 B1 * 10/2018 Jorgovanovic ...... H04L 65/4076
10,476,633 B2 * 11/2019 Robert Safavi ..... H04W 52/283
(Continued)

FOREIGN PATENT DOCUMENTS

WO    2016/185530 A1    11/2016
WO    2017/139005 A1    8/2017

OTHER PUBLICATIONS

Zhiguo Ding, "Impact of User Pairing on 5G Non-Orthogonal Multiple Access Downlink Transmissions", 2015, IEEE 2015. 2480766, p. 1-13 (Year: 2015).*

(Continued)

*Primary Examiner* — Alpus Hsu
*Assistant Examiner* — Camquyen Thai
(74) *Attorney, Agent, or Firm* — Sage Patent Group (57) ABSTRACT

A CSI-constrained UE grouping system for dense uplink NOMA systems. For example, a network node (e.g., an access point, such as a base station) determines which UEs should be grouped based on the uplink (UL) rate demand (UL traffic demand), and sends appropriate parameters to those UEs for UL transmission.

15 Claims, 10 Drawing Sheets

(51) Int. Cl.
  *H04W 72/04* (2009.01)
  *H04W 72/12* (2009.01)
  *H04W 72/08* (2009.01)
  *H04L 5/00* (2006.01)

(52) U.S. Cl.
  CPC ....... *H04W 52/267* (2013.01); *H04W 72/042* (2013.01); *H04W 72/0446* (2013.01); *H04W 72/0453* (2013.01); *H04W 72/0473* (2013.01); *H04W 72/085* (2013.01); *H04W 72/121* (2013.01); *H04W 72/1289* (2013.01); *H04L 5/0005* (2013.01); *H04L 5/0051* (2013.01); *H04W 72/1231* (2013.01)

(58) Field of Classification Search
  CPC ... H04W 4/08; H04W 52/267; H04W 72/042; H04W 72/0446; H04W 72/0453; H04W 72/0473; H04W 72/085; H04W 72/121; H04W 72/1289
  See application file for complete search history.

(56) References Cited

U.S. PATENT DOCUMENTS

| | | | |
|---|---|---|---|
| 2006/0039318 A1 | 2/2006 | Oh et al. | |
| 2010/0329188 A1* | 12/2010 | Jen | H04B 7/2606 370/328 |
| 2011/0044272 A1* | 2/2011 | Cui | H04L 5/0035 370/329 |
| 2014/0029522 A1* | 1/2014 | Farmanbar | H04B 7/0626 370/329 |
| 2015/0126118 A1* | 5/2015 | Lin | H04W 76/14 455/41.2 |
| 2016/0065401 A1* | 3/2016 | Jia | H04L 5/0003 375/298 |
| 2016/0219529 A1* | 7/2016 | Benjebbour | H04W 52/242 |
| 2016/0249302 A1* | 8/2016 | Uchiyama | H04J 11/0056 |
| 2016/0261315 A1* | 9/2016 | Fujishiro | H04B 7/0639 |
| 2017/0223636 A1* | 8/2017 | Ogawa | H04L 25/0212 |
| 2017/0230942 A1* | 8/2017 | Lim | H04L 5/02 |
| 2017/0303276 A1* | 10/2017 | Cheng | H04L 1/0015 |
| 2017/0367067 A1* | 12/2017 | Hwang | H04B 17/327 |
| 2018/0042021 A1* | 2/2018 | Wang | H04W 72/0473 |
| 2018/0063822 A1* | 3/2018 | Guo | H04B 7/0452 |
| 2018/0070274 A1 | 3/2018 | Ode | |
| 2018/0159643 A1* | 6/2018 | Huang | H04W 52/346 |
| 2018/0160402 A1* | 6/2018 | Huang | H04L 5/0053 |
| 2018/0206250 A1* | 7/2018 | Lee | H04L 5/0051 |
| 2018/0227903 A1* | 8/2018 | Uchiyama | H04W 72/04 |
| 2018/0234867 A1* | 8/2018 | Wang | H04L 5/006 |
| 2018/0279365 A1* | 9/2018 | Wang | H04W 74/0808 |
| 2018/0352559 A1* | 12/2018 | Duet | H04W 72/1231 |
| 2020/0092822 A1* | 3/2020 | Kang | H04W 52/50 |
| 2020/0396698 A1* | 12/2020 | Bala | H04L 5/0005 |

OTHER PUBLICATIONS

Fei Liu, "Proportional Fairness-Based User Pairing and Power Allocation for Non-Orthogonal Multiple Access", 2015, IEEE, p. 1306-1310. (Year: 2015).*
3GPP TR 36.866 V12.0.1, 3rd Generation Partnership Project; Technical Specification Group Radio Access Network; Study on Network-Assisted Interference Cancellation and Suppression (NAIC) for LTE (Release 12), Mar. 2014, 64 pages.
3GPP TR 36.859 V13.0.0, 3rd Generation Partnership Project; Technical Specification Group Radio Access Network; Study on Downlink Multiuser Superposition Transmission, (MUST) for LTE (Release 13), Dec. 2015, 48 pages.
3GPP TSG RAN WG1 Meeting #86, R1-166056, "Final Report of 3Gpp TSG RAN WG1 #85 V1.0.0" MCC Support, Göteborg, Sweden, Aug. 2016, 170 pages.
Xu, Peng et al., "NOMA: An Information Theoretic Perspective", IEEE, arXiv: 1504.07751v2 [cs.IT], May 2015, 6 pages.
International Search Report and Written Opinion issued in International Application No. PCT/EP2018/0053733, dated Oct. 11, 2018, 16 pages.
3GPP TSG RAN WG1 Meeting AH 1801, R1-1800686, Vancouver, Canada, Jan. 22-26, 2018, NTT Docomo, Inc., "NOMA scheme with user grouping", 6 pages.
First Indian Office Action and English Translation, issued in corresponding Indian Patent Application No. 201847009526 dated Feb. 21, 2020, 9 pages.

* cited by examiner

APPARATUSES, METHODS AND COMPUTER PROGRAMS FOR GROUPING USERS IN A NON-ORTHOGONAL MULTIPLE ACCESS (NOMA) NETWORK

CROSS REFERENCE TO RELATED APPLICATION(S)

This application is a 35 U.S.C. § 371 National Stage of International Patent Application No. PCT/EP2018/053733, filed Feb. 15, 2018, designating the United States, the disclosure of which is incorporated by reference.

TECHNICAL FIELD

Disclosed are embodiments related non-orthogonal multiple access (NOMA) networks.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA not only outperforms OMA in terms of sum rate, but also is optimal in achieving the maximum capacity region. However, the performance gain of NOMA depends greatly on the availability of channel state information (CSI), which affects the UEs pairing, beamforming and power allocation significantly. On the other hand, due to the implementation complexity and the decoding delay of NOMA, it is of most interest to use NOMA in dense networks where a large number of UEs may request access at the same time such that there are not enough orthogonal resources to serve all of the requesting UEs an OMA-fashion. In such scenarios, CSI acquisition becomes the bottleneck of the system performance as it may consume a large portion of the available spectrum.

Certain embodiments disclosed herein provide a CSI-constrained UE grouping system for dense uplink NOMA systems. For example, a network node (e.g., an access point, such as a base station) determines which UEs should be grouped based on the uplink (UL) rate demand (UL traffic demand), and sends appropriate parameters to those UEs for UL transmission. Such a UE receives the parameters and sends its data in resources that are shared with the other UE(s) with which it is grouped based on the determined parameters. The objective is to satisfy the tradeoff between the performance gain of NOMA and the cost of CSI acquisition.

For instance, in one aspect there is provided a method performed by a network node for scheduling at least a first UE served by the network node and a second UE also by the network node, wherein the first UE has a first rate demand and the second UE has a second rate demand. The method includes the network node determining, based on the rate demands of the first and second UE, that the first UE and the second UE are candidates to be paired together. After determining that the first UE and the second UE are candidates to be paired together, the network node estimates 1) a first channel quality of a first channel between the first UE and the network node and 2) a second channel quality of a second channel between the second UE and the network node. After estimating the channel qualities, the network node determines, based on the estimated channel qualities, that the first UE and the second UE should be "paired" (or "grouped")—i.e., scheduled to use the same time and frequency resources to transmit uplink data. The network node may then schedule the first UE and the second UE to use the same time and frequency resources to transmit uplink data.

In some embodiments, the step of determining that the first UE and the second UE are candidates to be paired together includes calculating a probability value and determining whether the calculated probability value is not less than a probability threshold. In some embodiments, the probability value indicates a probability that a first transmit power that can support the first rate demand is not greater than a power threshold and a second transmit power that can support the second rate demand is not greater than a power threshold.

In some embodiments, the step of estimating the first channel quality includes requesting the first UE to transmit a pilot signal and estimating the first channel quality based on the pilot signal transmitted by the first UE, and estimating the second channel quality includes requesting the second UE to transmit a pilot signal and estimating the second channel quality based on the pilot signal transmitted by the second UE.

In some embodiments, the step of scheduling the first UE and the second UE to use the same time and frequency resources to transmit uplink data includes transmitting to the first UE a first scheduling message and transmitting to the second UE a second scheduling message.

In some embodiments, the step of scheduling the first UE and the second UE to use the same time and frequency resources to transmit uplink data includes transmitting a synchronization signal to synchronize the transmit timing of the first and second UEs.

In some embodiments, the method also includes obtaining information indicating the first rate demand and obtaining information indicating the second rate demand. In some embodiments, obtaining information indicating the first rate demand comprises receiving a buffer status report from the first UE, and obtaining information indicating the second rate demand comprises receiving a buffer status report from the second UE.

In another embodiment the method includes the first and second UEs sending their UL rate demands (e.g., scheduling request or buffer status report). Using the UL rate demand and without CSI, the network node decides, based on their rate demands, whether the first and second UEs pairing candidates. Assuming the UEs are pairing candidates, the network node then asks the UEs to send pilot signals in specific resources. After receiving and processing the pilots, the network node makes the final decision about the multiplexing scheme and the appropriate parameter settings. The multiplexing schemes and the transmission parameters are fed back to the UEs, which adapt their power levels, etc. accordingly Compared to the conventional NOMA techniques, the above embodiment reduces the CSI acquisition overhead considerably. In the proposed method, it is not required that all UEs send their CSI. For example, CSI may be transmitted to the network node after the network node has determined that, with high probability, certain UEs can be grouped in a NOMA fashion. This leads to remarkable improvement in the end-to-end throughput. Particularly, the relative overhead reduction and throughput gains increase in dense scenarios, which are of most interest in NOMA-based systems.

BRIEF DESCRIPTION OF THE DRAWINGS

The accompanying drawings, which are incorporated herein and form part of the specification, illustrate various embodiments.

DETAILED DESCRIPTION

Figure 1:
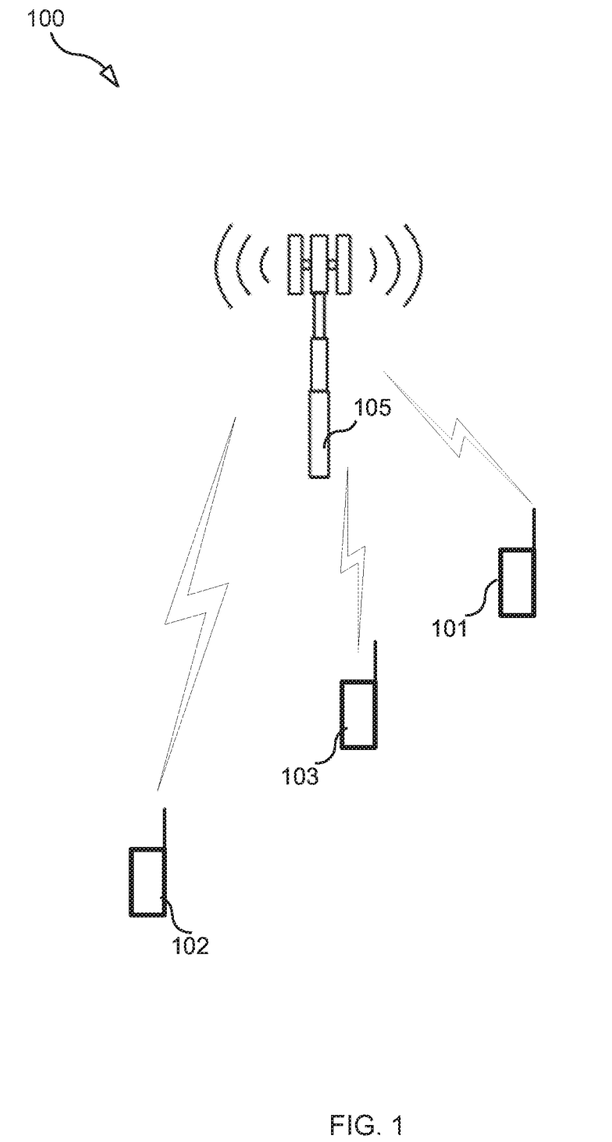
FIG. 1 illustrates a TRP communicating with a UE using a high-gain beam.

FIG. 1 illustrates a network 100 having a network node 105 (e.g., access point (AP) such as, for example, a 4G or 5G base station or other access point) serving a large number of UEs—e.g., UE 101, UE 102, UE 103, etc. While only three UEs are shown, network node 150 may serve N number of UEs, where N>>3. The UEs connect to the network node 105 using a limited number of spectrum resource blocks, i.e., time-frequency chunks.

Let us consider a single time slot, so that the time-frequency chunks refer to different frequency bands. Also, denote the number of UEs by N and the number of chunks by N_c, and assume that N_c<N, —that is, the number of resources are not enough to serve all UEs in orthogonal resources. In this scenario, two or more UEs may be grouped and served in a NOMA-based fashion. In an ideal case, NOMA has the potential to improve the performance of OMA-based systems, in terms of network capacity. However, the performance gain of NOMA depends much on the amount of CSI available. Particularly, the throughput of NOMA-based approach depends on if there are appropriate UE groupings. However, to perform an appropriate UE grouping we need to have accurate information about the quality of the various channels between the UEs and the network node 105 and the UEs' rate demands, which leads to huge overhead in dense networks. For instance, the optimal pairing algorithm needs to know all N_c×N channel coefficients and all N rate demands making the whole system impractical in dense scenarios. This is especially true because a large portion of this CSI is used only for UE grouping and not for data transmission. Therefore, to implement NOMA in dense networks, it is beneficial to design a limited CSI-based scheme.

An embodiment can be explained as follows:

Step 1: The network node 105 requests each UE (e.g., UE 101 and UE 102) to send its rate demand (e.g., a scheduling request or a buffer status report).

Step 2: The network node 105 receives UE 101's and UE 102's rate demands.

Step 3: The network node 105 determines a probability that, considering the UEs' peak power constraints, UE 101 and UE 102 can be successfully served through NOMA-based data transmission.

As an example for finding this probability, assume that UE 101 has a rate demand of $r_i$ and UE 102 has a rate demand of $r_j$. Also, assume that the UEs' distances to the network node are not known, which is an appropriate model in dense networks with many UEs' having a bursty communications pattern. With uplink NOMA, the achievable rate for UE 101 and UE 102 of is given by:

$$\begin{cases} R_{i,NOMA} = \log_2\left(1 + \frac{P_i g_i}{1 + P_j g_j}\right) \text{ [bit/symbol]} & (i) \\ R_{j,NOMA} = \log_2(1 + P_j g_j), \text{ [bit/symbol]} & (ii) \end{cases} \quad (1)$$

Here, $P_i$ is the transmit power of UE 101 and $g_i$ represents the channel gain of channel between UE 101 and network node 105. Also, (1) is based on the assumption that $g_i \geq g_j$ which is still not known by the BS (Thus, it will redo the following analysis under the assumption $g_i < g_j$ as well). In this way, the rate demands $r_i$ and $r_j$ can be supported by NOMA if:

$$\begin{cases} P_i \geq \frac{(2^{r_i} - 1)2^{r_j}}{g_i} & (i) \\ P_j \geq \frac{2^{r_j} - 1}{g_j}, & (ii) \end{cases} \quad (2)$$

Then, denoting the UEs' peak power constraints by $P_{i,max}$ and $P_{j,max}$, the probability that the rate demands of these UEs can be supported by NOMA is given by:

$$\Theta_{i,j} = Pr\left(\frac{2^{r_j}-1}{g_j} \leq P_{j,max} \ \& \ \frac{(2^{r_i}-1)2^{r_j}}{g_i} \leq P_{i,max}\right) = \quad (3)$$

$$Pr\left(g_j \geq \frac{2^{r_j}-1}{P_{j,max}} \ \& \ g_i \geq \frac{(2^{r_i}-1)2^{r_j}}{P_{i,max}}\right) =$$

$$E_{d_i,d_j}\left\{e^{-\frac{d_i^\alpha(2^{r_i}-1)2^{r_j}}{P_{i,max}}} e^{-\frac{d_j^\alpha(2^{r_j}-1)}{P_{j,max}}}\right\}.$$

Here, $E_{d_i,d_j}\{.\}$ denotes the expectation over the UE 101 and UE 102 distances (di and dj, respectively) and the last equality is given for Rayleigh-fading conditions, while it can be rewritten for other channel distributions as well. In this way, network node 105 finds the probabilities $\Theta_{i,j}$ and $\Theta_{j,i}$. Alpha ($\alpha$) is a determined path loss value.

Step 4: If the $\Theta_{i,j} \geq \theta$ or $\Theta_{j,i} \geq \theta$, where $\theta$ is a constant that can be preconfigured by the network node, i.e., if the network node estimates a high probability that UE 101 and UE 102 can be successfully paired, the network node assigns resources for UL transmission and asks each of UE 101 and UE 102 to send a pilot signal (e.g., UE 101 may be asked first and then UE 102 so that the pilot signals are sent sequentially). For instance, network node 105 may select a first a random frequency band and request UE 101 and UE 102 to transmit a pilot signal in the selected frequency band.

Step 5: Using the received pilot signals, network node 105 estimates a channel quality for UE 101 link and estimates a channel quality for UE 101 link. Network node then decides if the UEs can be paired and, if so, determines the appropriate power level of each UE such that their rate demands can be satisfied.

Step 6: Assuming that network node 105 determines that UEs 101 and 102 can be paired, network node 105 informs each of the UEs as to the power level that the UE may use. Additionally, network node synchronizes the transmit timing of the UEs. For example, network node 105 sends synchronization signals to synchronize the transmit timings.

In equations (1)-(3), a pairing scheme based on the UEs average channel conditions was developed. However, different approaches can be considered as well. For instance, according to equations (1)-(3), the probability that two UEs can be successfully paired increases if one of the rate demands $r_i$ or $r_j$ is low. Thus, to have the maximum number of paired UEs, the BS can consider the pairs with the highest and lowest rate demands. For instance, considering $r_1 \leq r_2 \ldots \leq r_N$, an appropriate UE pairing approach would be to: pair UE 1 with UE N, pair UE 2 with UE N-1, etc.

With the proposed scheme, the channel quality is determined only if the BS estimates a high probability for successful UE pairing. This reduces CSI overhead considerably, particularly in dense networks and/or in the cases with multiple antennas at the UEs.

In the above described embodiments, network node 105 first obtains the UEs' rate demands and then requests the UEs to send pilot signals. As a second approach, the reverse case may be considered, where the BS first asks all UEs to send pilots in a selected frequency band (a randomly selected frequency band). Then, estimating the channel quality of all UEs, the BS considers the potential UEs to be paired and asks them to send their rate demands. While this approach reduces the overhead compared to the globally-optimal case with all UEs sending rate demands/pilots in all bands, it leads to higher overhead compared to the other embodiments. This is particularly because with this second approach 1) network node 105 needs to estimate the channels of all UEs and 2) to avoid overlap, the pilots need to be sent sequentially, which needs synchronization and increases the delay. Moreover, compared to sending the rate demands, sending pilot signals/channel estimation may be more costly especially when the number of antennas per-UE increases.

Figure 2:
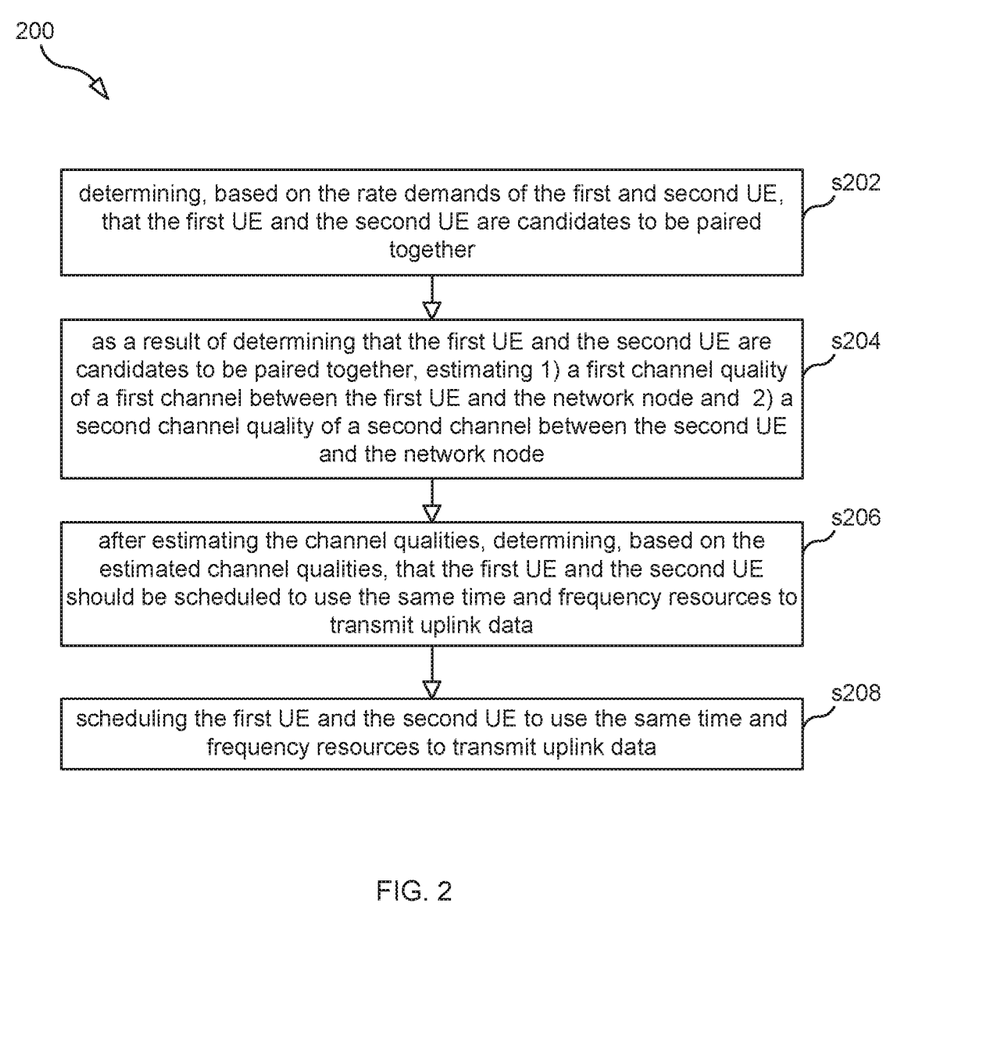
FIG. 2 is a flow chart illustrating a process according to one embodiment.

FIG. 2 is a flow chart illustrating a process 300, according to some embodiments, that is performed by network node 105 for scheduling at least a first UE (UE 101) served by the network node and a second UE (UE 102) also served by the network node, wherein UE 101 has a first rate demand (r1) and UE 102 has a second rate demand (r2). Process 300 may begin with step s202 in which network node 105 determines, based on the rate demands of UE 101 and UE 102, that UE 101 and UE 102 are candidates to be paired together. In step s204, as a result of determining that UE 101 and UE 102 are candidates to be paired together, network node estimates 1) a first channel quality of a first channel between UE 101 and the network node and 2) a second channel quality of a second channel between UE 102 and the network node. In step s206, after estimating the channel qualities, network node 105 determines, based on the estimated channel qualities, that UE 101 and UE 102 should be scheduled to use the same time and frequency resources to transmit uplink data. In step s208, network node schedules UE 101 and UE 102 to use the same time and frequency resources to transmit uplink data.

In some embodiments, determining that UE 101 and UE 102 are candidates to be paired together comprises: calculating a probability value; and determining whether the calculated probability value is not less than a probability threshold. In some embodiments, the probability value indicates a probability that a first transmit power that can support the first rate demand is not greater than a power threshold and a second transmit power that can support the second rate demand is not greater than a power threshold.

In some embodiments, estimating the first channel quality comprises: requesting UE 101 to transmit a pilot signal and estimating the first channel quality based on the pilot signal transmitted by UE 101, and estimating the second channel quality comprises: requesting UE 102 to transmit a pilot signal and estimating the second channel quality based on the pilot signal transmitted by UE 102.

In some embodiments, scheduling UE 101 and UE 102 to use the same time and frequency resources to transmit uplink data comprises: transmitting to UE 101 a first scheduling message; and transmitting to UE 102 a second scheduling message.

In some embodiments, scheduling UE 101 and UE 102 to use the same time and frequency resources to transmit uplink data comprises transmitting a synchronization signal to synchronize the transmit timing of the first and UE 102s.

In some embodiments, process 300 further includes network node 105 obtaining information indicating the first rate demand and obtaining information indicating the second rate demand. In some embodiments, obtaining information indicating the first rate demand comprises receiving a buffer status report from UE 101; and obtaining information indicating the second rate demand comprises receiving a buffer status report from UE 102.

Figure 3:
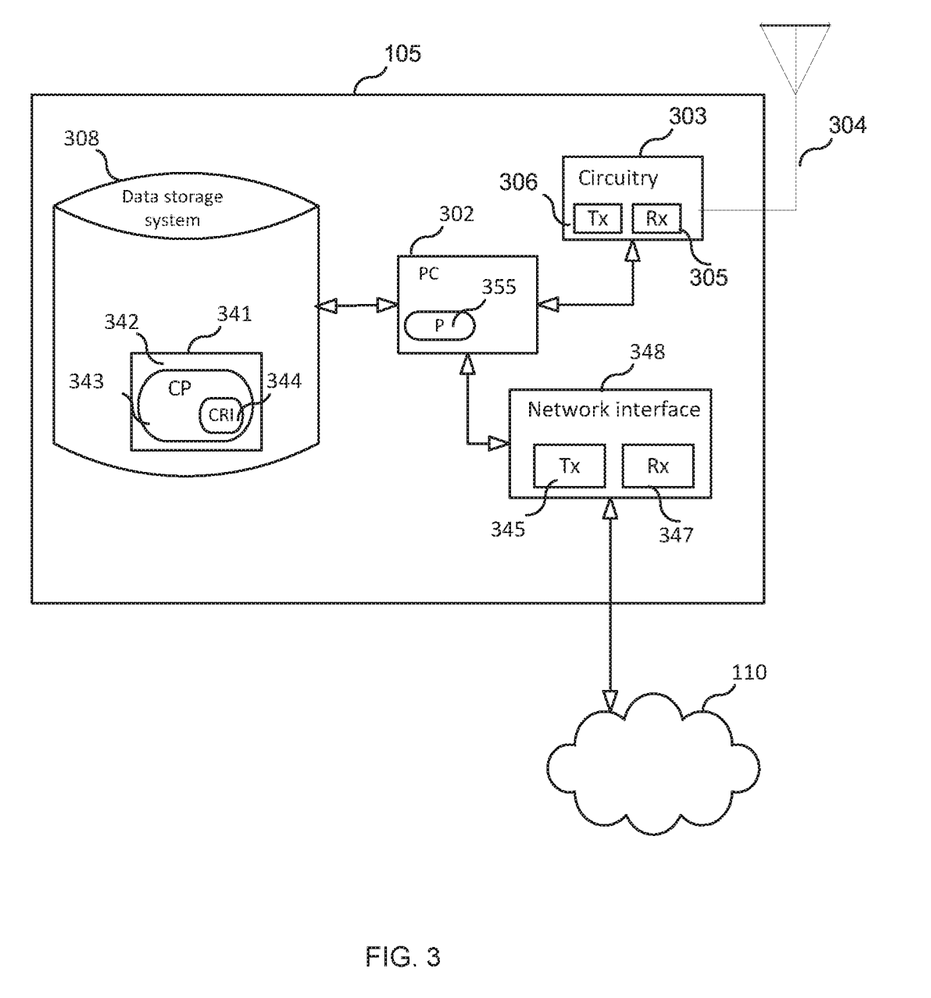
FIG. 3 is a block diagram of an access point according to one embodiment.

FIG. 3 is a block diagram of AP 105 according to some embodiments. As shown in FIG. 3, AP 105 may comprise: a processing circuit (PC) 302, which may include one or more processors (P) 355 (e.g., a general purpose microprocessor and/or one or more other processors, such as an application specific integrated circuit (ASIC), field-programmable gate arrays (FPGAs), and the like); a network interface 348 comprising a transmitter (Tx) 345 and a receiver (Rx) 347 for enabling AP 105 to transmit data to and receive data from other nodes connected to a network 110 (e.g., an Internet Protocol (IP) network) to which network interface 348 is connected; circuitry 303 (e.g., radio transceiver circuitry comprising an Rx 305 and a Tx 306) coupled to an antenna system 304 for wireless communication with UEs); and local storage unit (a.k.a., "data storage system") 308, which may include one or more non-volatile storage devices and/or one or more volatile storage devices (e.g., random access memory (RAM)). In embodiments where DPA 302 includes a programmable processor, a computer program product (CPP) 341 may be provided. CPP 341 includes a computer readable medium (CRM) 342 storing a computer program (CP) 343 comprising computer readable instructions (CRI) 344. CRM 342 may be a non-transitory computer readable medium, such as, but not limited, to magnetic media (e.g., a hard disk), optical media, memory devices (e.g., random access memory, flash memory), and the like. In some embodiments, the CRI 344 of computer program 343 is configured such that when executed by data processing apparatus 302, the CRI causes AP 105 to perform steps described herein (e.g., steps described herein with reference to the flow charts and/or message flow diagrams). In other embodiments, AP 105 may be configured to perform steps described herein without the need for code. That is, for example, DPA 302 may consist merely of one or more ASICs. Hence, the features of the embodiments described herein may be implemented in hardware and/or software.

Figure 4:
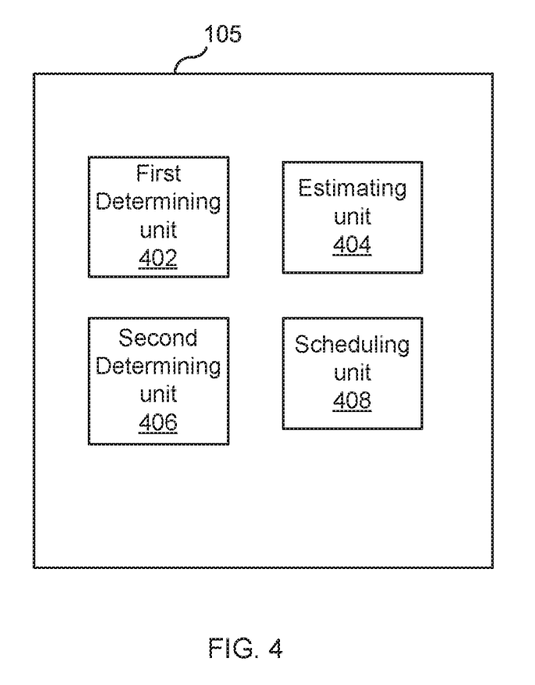
FIG. 4 is a diagram showing functional units of an access point according to one embodiment.

FIG. 4 is a diagram showing functional units of network node 105 according to some embodiments. As shown in FIG. 4, network node 105 includes a first determining unit 402 for determining, based on the rate demands of the first and second UE, that the first UE and the second UE are candidates to be paired together; an estimating unit 404 for estimating 1) a first channel quality of a first channel between the first UE and the network node and 2) a second channel quality of a second channel between the second UE and the network node; a second determining unit 406 for determining, based on the estimated channel qualities, that the first UE and the second UE should be scheduled to use the same time and frequency resources to transmit uplink data; and a scheduling unit 408 for scheduling the first UE and the second UE to use the same time and frequency resources to transmit uplink data.

While the example have used only two UEs, the embodiments can group any number of UEs.

Figure 5:
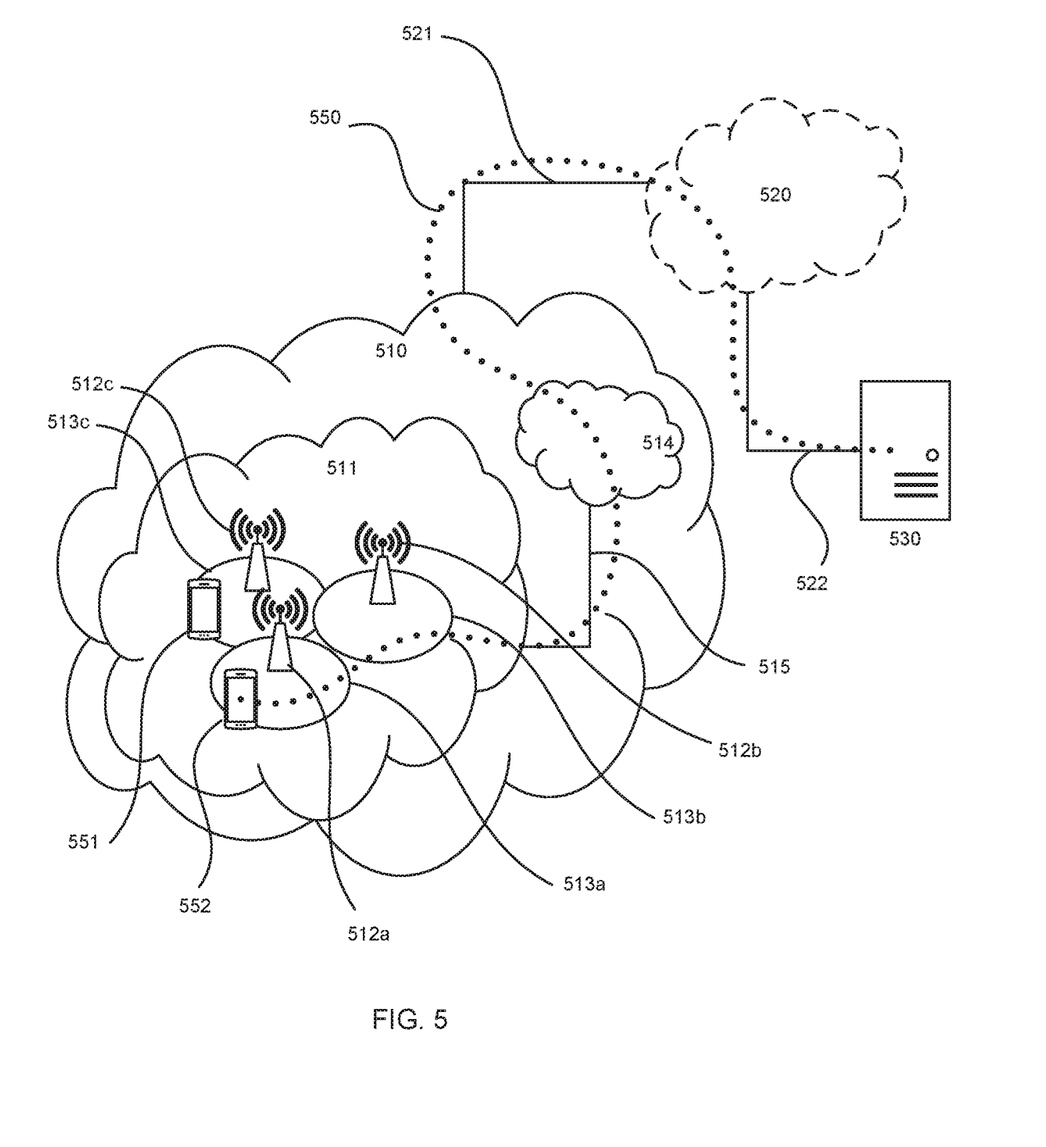
FIG. 5 schematically illustrates a telecommunication network connected via an intermediate network to a host computer.

FIG. 5 illustrates a telecommunication network connected via an intermediate network to a host computer in accordance with some embodiments. With reference to FIG. 5, in accordance with an embodiment, a communication system includes telecommunication network 510, such as a 3GPP-type cellular network, which comprises access network 511, such as a radio access network, and core network 514. Access network 511 comprises a plurality of APs (hereafter base stations) 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more subnetworks (not shown).

The communication system of FIG. 5 as a whole enables connectivity between the connected UEs 591, 592 and host computer 530. The connectivity may be described as an over-the-top (OTT) connection 550. Host computer 530 and the connected UEs 551 and 552 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6, which illustrates a host computer communicating via a base station with a user equipment over a partially wireless connection in accordance with some embodiments. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
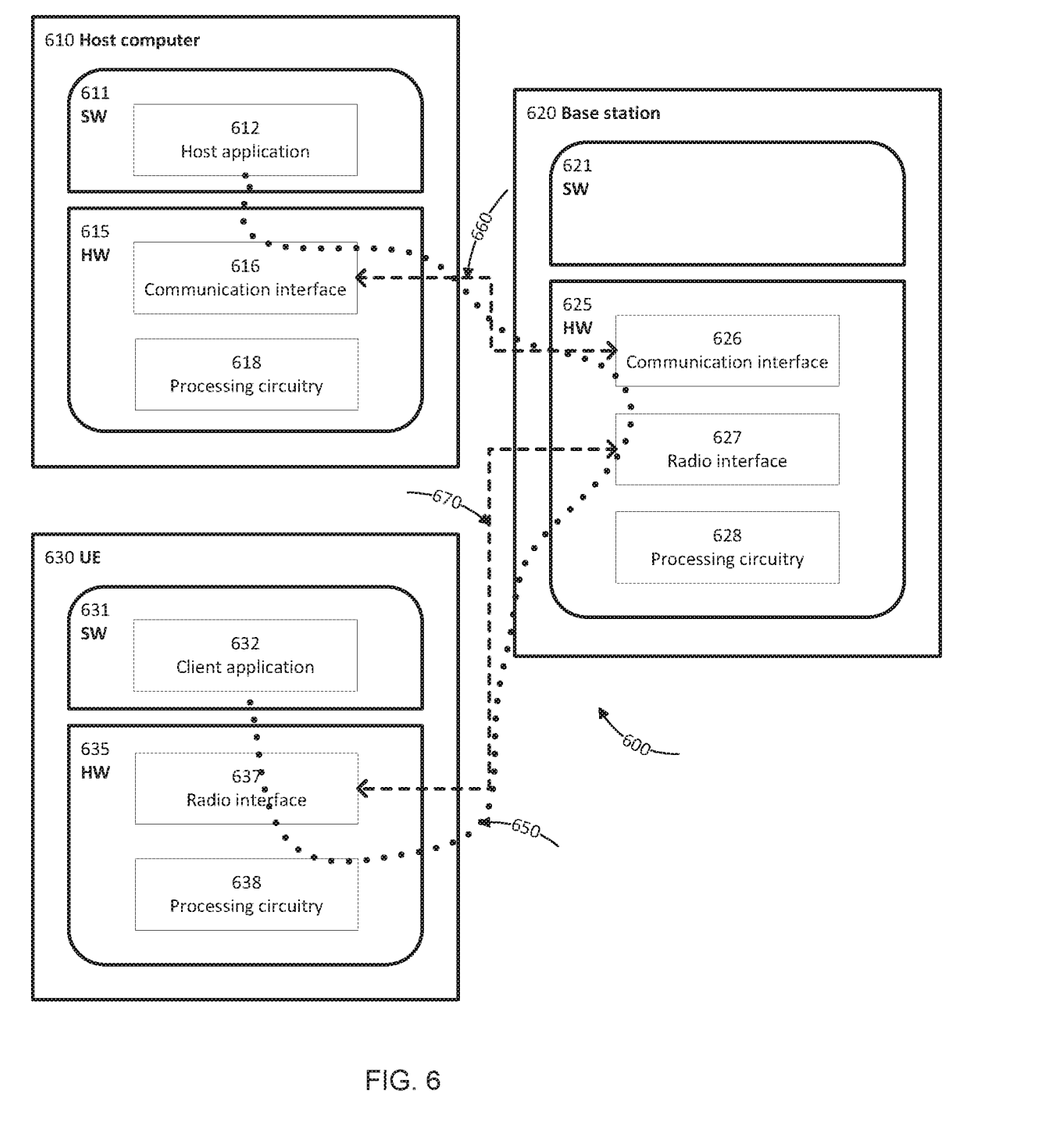
FIG. 6 is a generalized block diagram of a host computer communicating via a base station with a user equipment over a partially wireless connection.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
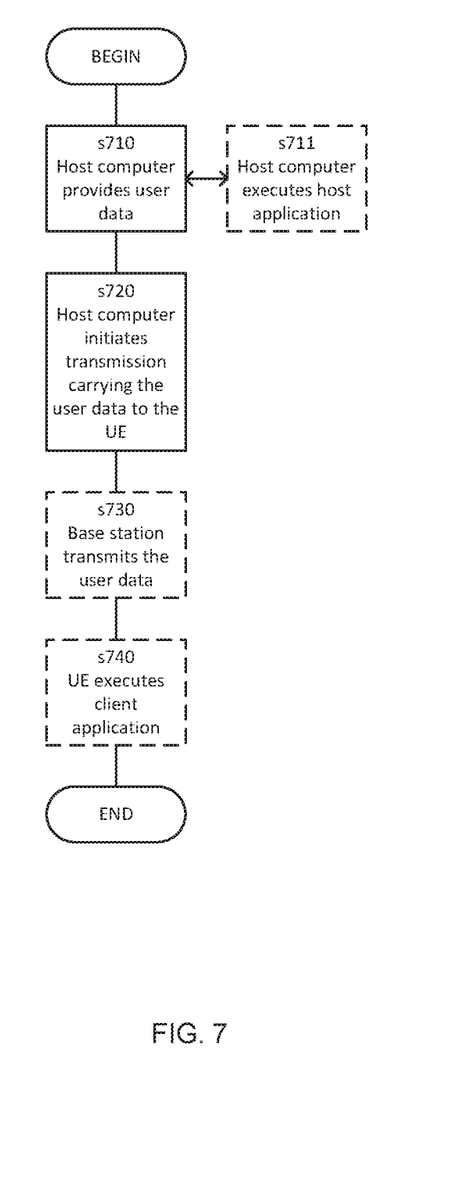
FIG. 7 is a flowchart illustrating a method implemented in a communication system including a host computer, a base station and a user equipment.

FIG. 7 is a flowchart illustrating a method implemented in a communication system, in accordance with one embodiment. The communication system includes a host computer, a base station and a UE which may be those described with reference to FIG. 5 and FIG. 6. In step S710, the host computer provides user data. In substep S711 (which may be optional) of step S710, the host computer provides the user data by executing a host application. In step S720, the host computer initiates a transmission carrying the user data to the UE. In step S730 (which may be optional), the base station transmits to the UE the user data which was carried in the transmission that the host computer initiated, in accordance with the teachings of the embodiments described throughout this disclosure. In step S740 (which may also be optional), the UE executes a client application associated with the host application executed by the host computer.

Figure 8:
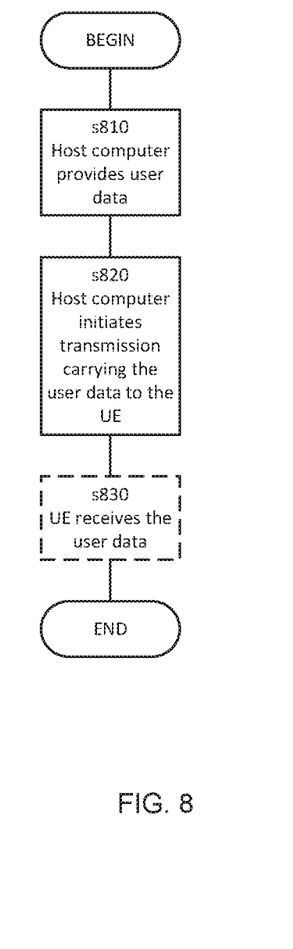
FIG. 8 is a flowchart illustrating a method implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 8 will be included in this section. In step S810 of the method, the host computer provides user data. In an optional substep (not shown) the host computer provides the user data by executing a host application. In step S820, the host computer initiates a transmission carrying the user data to the UE. The transmission may pass via the base station, in accordance with the teachings of the embodiments described throughout this disclosure. In step S830 (which may be optional), the UE receives the user data carried in the transmission.

Figure 9:
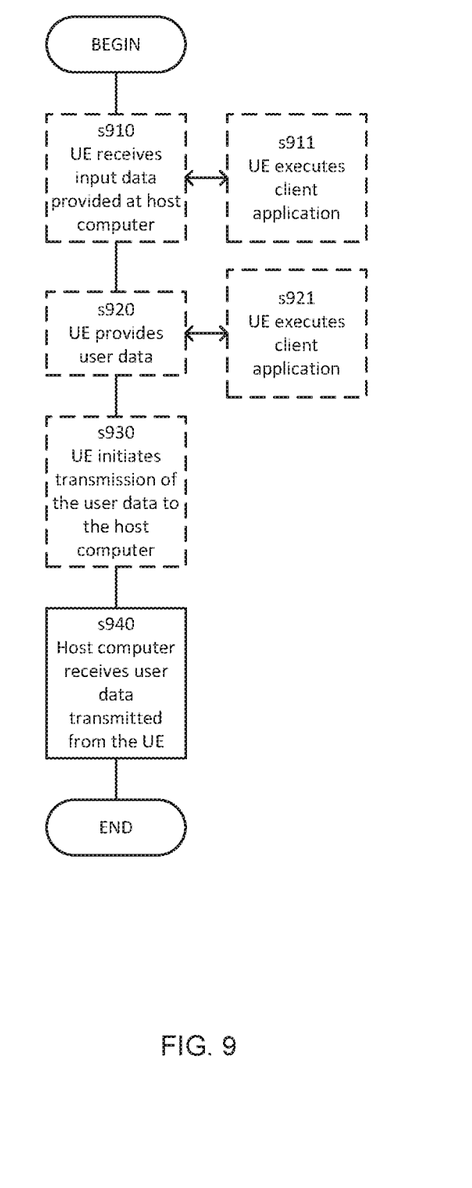
FIG. 9 is a flowchart illustrating a method implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 9 will be included in this section. In step S910 (which may be optional), the UE receives input data provided by the host computer. Additionally or alternatively, in step S920, the UE provides user data. In substep S921 (which may be optional) of step S920, the UE provides the user data by executing a client application. In substep S911 (which may be optional) of step S910, the UE executes a client application which provides the user data in reaction to the received input data provided by the host computer. In providing the user data, the executed client application may further consider user input received from the user. Regardless of the specific manner in which the user data was provided, the UE initiates, in substep S930 (which may be optional), transmission of the user data to the host computer. In step S940 of the method, the host computer receives the user data transmitted from the UE, in accordance with the teachings of the embodiments described throughout this disclosure.

Figure 10:
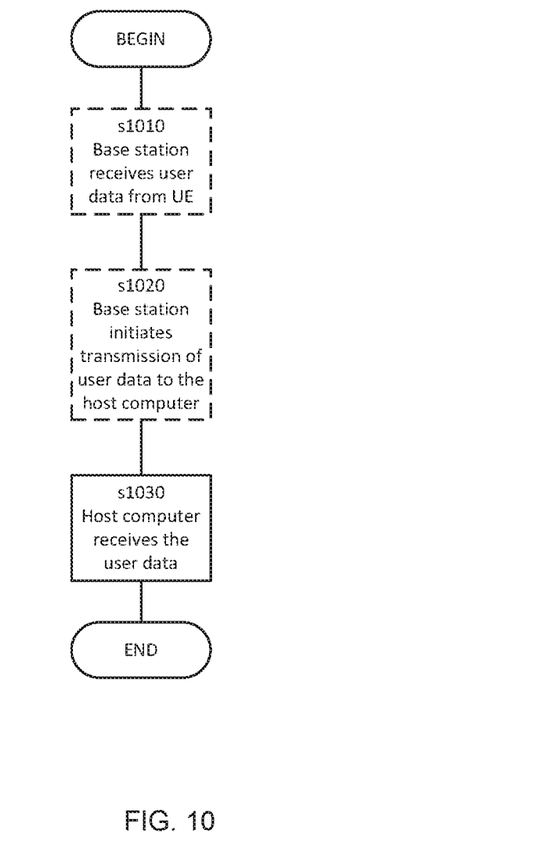
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 5 and FIG. 6. For simplicity of the present disclosure, only drawing references to FIG. 10 will be included in this section. In step S1010 (which may be optional), in accordance with the teachings of the embodiments described throughout this disclosure, the base station receives user data from the UE. In step S1020 (which may be optional), the base station initiates transmission of the received user data to the host computer. In step S1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a network node for scheduling at least a first user equipment (UE) served by the network node and a second UE also served by the network node, wherein the first UE has a first rate demand and the second UE has a second rate demand, the method comprising:
   determining, based on the rate demands of the first UE and second UE, the rate demands being an uplink (UL) traffic demand, that the first UE and the second UE are candidates to be paired together, wherein determining, based on the rate demands of the first UE and second UE, that the first UE and the second UE are the candidates to be paired together comprises:
      calculating a probability value related to the first rate demand and the second rate demand, wherein the probability value indicates a probability that a first transmit power that can support the first rate demand is not greater than a first power threshold and a second transmit power that can support the second rate demand is not greater than a second power threshold being different than the first power threshold; and
      determining whether the calculated probability value is not less than a probability threshold;
   as a result of determining that the first UE and the second UE are the candidates to be paired together, estimating 1) a first channel quality of a first channel between the first UE and the network node and 2) a second channel quality of a second channel between the second UE and the network node;
   after estimating the channel qualities, determining, based on the estimated channel qualities, that the first UE and the second UE should be scheduled to use same time resource and same frequency resource to transmit uplink data; and scheduling the first UE and the second UE to use the same time and frequency resources to transmit the uplink data.

2. The method of claim 1, wherein estimating the first channel quality comprises: requesting the first UE to transmit a pilot signal and estimating the first channel quality based on the pilot signal transmitted by the first UE, and estimating the second channel quality comprises: requesting the second UE to transmit a pilot signal and estimating the second channel quality based on the pilot signal transmitted by the second UE.

3. The method of claim 1, wherein scheduling the first UE and the second UE to use the same time and frequency resources to transmit the uplink data comprises: transmitting to the first UE a first scheduling message; and transmitting to the second UE a second scheduling message.

4. The method of claim 1, wherein scheduling the first UE and the second UE to use the same time and frequency resources to transmit the uplink data comprises transmitting a synchronization signal to synchronize transmit timing of the first UE and transmit timing of the second UE.

5. The method of claim 1, further comprising: obtaining information indicating the first rate demand; and obtaining information indicating the second rate demand.

6. The method of claim 5, wherein the obtaining information indicating the first rate demand comprises receiving a buffer status report from the first UE; and the obtaining information indicating the second rate demand comprises receiving a buffer status report from the second UE.

7. A non-transitory computer readable medium including a computer program, comprising instructions which, when executed on at least one processor of an access point, cause the access point to carry out the method according to claim 1.

8. The method of claim 1, wherein determining that the first UE and the second UE are the candidates to be paired together is further based on the first transmit power of the first UE and the second transmit power of the second UE.

9. The method of claim 1, wherein determining that the first UE and the second UE are the candidates to be paired together is further based on a first channel gain of the first channel and a second channel gain of the second channel.

10. A network node for scheduling at least a first user equipment (UE) served by the network node and a second UE also served by the network node, wherein the first UE has a first rate demand and the second UE has a second rate demand, the network node comprising:
a processor; and
a memory coupled to the processor, the memory comprising instructions executable by the processor, wherein the network is configured to:
determine, based on the rate demands of the first UE and second UE, the rate demands being an uplink (UL) traffic demand, that the first UE and the second UE are candidates to be paired together, wherein the network node is configured to determine that the first UE and the second UE are the candidates to be paired together by performing a procedure comprising:
calculating a probability value related to the first rate demand and the second rate demand, wherein the probability value indicates a probability that a first transmit power that can support the first rate demand is not greater than a first power threshold and a second transmit power that can support the second rate demand is not greater than a second power threshold being different than the first power threshold; and
determining whether the calculated probability value is not less than a probability threshold;
as a result of determining that the first UE and the second UE are the candidates to be paired together, estimate 1) a first channel quality of a first channel between the first UE and the network node and 2) a second channel quality of a second channel between the second UE and the network node;
after estimating the channel qualities, determine, based on the estimated channel qualities, that the first UE and the second UE should be scheduled to use same time resource and same frequency resource to transmit uplink data; and
schedule the first UE and the second UE to use the same time and frequency resources to transmit the uplink data.

11. The network node of claim 10, wherein the network node is configured to estimate the first channel quality by performing a procedure comprising: requesting the first UE to transmit a pilot signal and estimating the first channel quality based on the pilot signal transmitted by the first UE, and the network node is configured to estimate the second channel quality by performing a procedure comprising: requesting the second UE to transmit a pilot signal and estimating the second channel quality based on the pilot signal transmitted by the second UE.

12. The network node of claim 10, wherein the network node is configured to schedule the first UE and the second UE to use the same time and frequency resources to transmit the uplink data by performing a procedure comprising: transmitting to the first UE a first scheduling message; and transmitting to the second UE a second scheduling message.

13. The network node of claim 10, wherein the network node is configured to schedule the first UE and the second UE to use the same time and frequency resources to transmit the uplink data by performing a procedure comprising transmitting a synchronization signal to synchronize transmit timing of the first and second UEs.

14. The network node of claim 10, wherein the network node is configured to: obtain information indicating the first rate demand; and obtain information indicating the second rate demand.

15. The network node of claim 14, wherein
the network node is configured to obtain the information indicating the first rate demand by performing a process comprising receiving a buffer status report from the first UE; and
the network node is configured to obtain the information indicating the second rate demand by performing a process comprising receiving a buffer status report from the second UE.

* * * * *